US009706444B2

(12) United States Patent
Tao

(10) Patent No.: US 9,706,444 B2
(45) Date of Patent: Jul. 11, 2017

(54) METHOD AND SYSTEM FOR ENABLING CIRCUIT SWITCHED FALLBACK SERVICE IN EVOLVED PACKET SYSTEM

(75) Inventor: Quanjun Tao, Shenzhen (CN)

(73) Assignee: ZTE Corporation (CN)

( * ) Notice: Subject to any disclaimer, the term of this patent is extended or adjusted under 35 U.S.C. 154(b) by 1486 days.

(21) Appl. No.: 14/237,095

(22) PCT Filed: Oct. 8, 2010

(86) PCT No.: PCT/CN2010/077585
§ 371 (c)(1),
(2), (4) Date: Feb. 4, 2014

(87) PCT Pub. No.: WO2011/044825
PCT Pub. Date: Apr. 21, 2011

(65) Prior Publication Data
US 2014/0177599 A1 Jun. 26, 2014

(30) Foreign Application Priority Data
Oct. 17, 2009 (CN) .......................... 2009 1 0174829

(51) Int. Cl.
*H04W 36/00* (2009.01)
(52) U.S. Cl.
CPC .............................. *H04W 36/0022* (2013.01)
(58) Field of Classification Search
CPC ............................................... H04W 36/0022
(Continued)

(56) References Cited

U.S. PATENT DOCUMENTS

2010/0265884 A1  10/2010  Vikberg et al.
2010/0278142 A1*  11/2010  Dwyer .............. H04W 36/0083
370/331

(Continued)

FOREIGN PATENT DOCUMENTS

CN  101222765  7/2008
CN  101453727  6/2009

(Continued)

OTHER PUBLICATIONS

International Search Report for PCT/CN2010/077585, English translation attached to original, Both completed by the Chinese Patent and Trakemark Office on Dec. 27, 2010, All together 10 Pages.

*Primary Examiner* — Andrew Chriss
*Assistant Examiner* — Ellen Kirillova
(74) *Attorney, Agent, or Firm* — Brooks Kushman P.C.

(57) ABSTRACT

The present document discloses a method and system for enabling a Circuit Switched Fallback (CSFB) service in an Evolved Packet System (EPS). The method may include, after accessing an EPS network, the User Equipment (UE) triggering the CSFB service when it executes the Circuit Switching (CS) network service, and the UE transmitting a CS network service request carrying a CSFB indication to a Mobility Management Entity (MME). The method may also include, after receiving the CS network service request carrying the CSFB indication transmitted by the UE, the MME indicating an Evolved Universal Mobile Telecommunication System Radio Access Network (E-UTRAN) to switch the UE to the CS network, and the E-UTRAN initiating the switching to switch the UE to the CS network through an MME and the Mobile Switching Center (MSC) with which the UE jointly registers when accessing the EPS network.

16 Claims, 6 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2010/0279677 A1* | 11/2010 | Dwyer | ................. | H04W 48/16 |
| | | | | 455/422.1 |
| 2010/0302937 A1 | 12/2010 | Hu et al. | | |
| 2010/0317347 A1* | 12/2010 | Burbidge | .......... | H04W 36/0088 |
| | | | | 455/436 |
| 2011/0013623 A1 | 1/2011 | Hu et al. | | |

FOREIGN PATENT DOCUMENTS

| | | |
|---|---|---|
| CN | 101499967 | 8/2009 |
| WO | 2009056932 | 5/2009 |

* cited by examiner

METHOD AND SYSTEM FOR ENABLING CIRCUIT SWITCHED FALLBACK SERVICE IN EVOLVED PACKET SYSTEM

CROSS-REFERENCE TO RELATED APPLICATION

This application is the U.S. national phase of PCT Application No. PCT/CN10/077585 filed on Oct. 8, 2010, which claims priority to Chinese Patent Application No. 200910174829.2 filed on Oct. 17, 2009, the disclosures of which are incorporated in their entirety by reference herein.

TECHNICAL FIELD

The present document relates to the field of mobile communications, and in particular, to a method and system for implementing Circuit Switched Fallback (CSFB for short) when a terminal accesses an Evolved Packet System (EPS for short) network.

BACKGROUND OF THE RELATED ART

In order to maintain powerful competitiveness of the 3rd Generation Partnership Project (3GPP for short) in the field of mobile communications, the 3GPP is currently devoting itself to researching on the evolution of a Packet Switched Core (PS Core for short) network and a Universal Mobile Telecommunication System Radio Access Network (UTRAN for short), with the purpose of enabling the evolved PS Core (EPC for short) to provide higher transmission rate and shorter transmission delay and support mobility management among Evolved UTRAN (E-UTRAN for short), GSM EDGE radio access network (GERAN for short), the UTRAN, the Wireless Local Area Network (WLAN for short) and other non-3GPP access networks, wherein, the GSM is Global System for Mobile communications and the EDGE is Enhanced Data Rate for GSM Evolution. This evolved mobile communication system is referred to as the Evolved Packet System (EPS for short).

FIG. 1 illustrates a diagram of architecture of enabling a CS service to fall back to a CS network when a terminal accesses an EPS network according to the prior art, and the various entities in FIG. 1 are illustrated as follows:

User Equipment (UE for short) 101;

UTRAN 102: a radio access network of a GSM/Universal Mobile Telecommunications System (UMTS for short) network, which provides circuit and packet radio access resources;

E-UTRAN 103: evolved radio access network, which can provide higher uplink and downlink rates, lower transmission delay and more reliable radio transmission, in the E-UTRAN, a network element Evolved NodeB (eNodeB for short) is included, which provides radio resources for accessing by the terminal;

Serving GPRS Supporting Node (SGSN for short) 104;
Serving Gateway (S-GW for short) 105, which is one entity of the user plane, and is responsible for data routing and processing of the user plane;

Mobility Management Entity (MME for short) 106, which is one entity of the control plane, i.e., a server which temporarily stores user data, is responsible for managing and storing UE contexts (for example, UE/user identities, mobility management statuses, user security parameters etc.), allocates temporal identities to the user, and is responsible for authenticating the user when the user resides in the tracking region or the network;

Mobile Switching Center (MSC for short) 107, which can be a new functional entity MSC Server etc. in and after the R4 stage, and is represented by MSC/Visitor Location Register (VLR) uniformly in the present document;

Public Switched Telephone Network (PSTN for short) 108, which refers to a fixed telephone network here.

When the UE accesses the EPS network, the MME is notified to perform joint registration, and is notified of the capability of supporting CSFB, the MME substitutes the UE to initiate the joint registration with the MSC, the MSC receives joint registration message, and if there is no user data, the user data is acquired from a Home Location Register (HLR for short).

FIG. 2 illustrates a calling flowchart of enabling a CS service to fall back to the CS network when a terminal accesses an EPS network in the prior art. The UE has been registered with the MME and the MSC in the EPS network, at this time, the UE initiates a CS service, the UE transmits enhanced service request message carrying a CSFB indication to the MME, the MME notifies the UE to fall back to the UTRAN network to perform CS service through the E-UTRAN after receiving the enhanced service request message, which comprises the following steps:

in step 201, the UE transmits an enhanced service request carrying a CSFB indication to the MME, wherein, the CSFN indication is used to indicate the MME to perform circuit switch service fallback;

in step 202, the MME transmits CSFB notification message carrying a CSFB indication to the E-UTRAN to notify the E-UTRAN that the local UE needs to fall back to the UTRAN network;

in step 203, the E-UTRAN can ask for a measurement report from the UE, and decide a specific cell to which the UE falls back according to the measurement report;

in step 204, if there are data services for the UE in the EPS network, the E-UTRAN triggers a packet domain switching process, to switch the data services to the UTRAN network, which will not be described in detail by the present document;

in step 205, if there is no data service for the UE in the EPS network, the E-UTRAN notifies the UE to perform fallback to be switched to the UTRAN network;

in step 206, after the switching is successful, the UE transmits service request message to the MSC of a serving target access cell in the UTRAN network;

in step 207, if the above MSC is an MSC with which the UE jointly registers when accessing the EPS network, the MSC makes determination according to the service data of the user, receives a service request of this time, returns service access response message to the UE, and there exist encryption and authentication processes subsequently, which will not be described in detail by the present document;

in step 208, if in step 206, the MSC is not an MSC with which the UE jointly registers when accessing the EPS network, there is no user data for the MSC, and the MSC returns service access rejection message to the UE to notify the UE to initiate a location update process;

in step 209, the UE reinitiates a location update process in the UTRAN;

in step 210, the MSC asks for authentication parameters from the HLR;

in step 211, the HLR returns the authentication parameters to the MSC, and the MSC receives the authentication parameters and notifies the UE to perform the authentication process;

in step 212, the authentication is successful;

in step 213, the MSC initiates a location update request to the HLR;

in step 214, the HLR notifies the source MSC to delete the user data;

in step 215, the source MSC notifies the MME to delete the association relationship;

in step 216, the MME returns deletion success message to the source MSC after deleting the user data successfully;

in step 217, the source MSC returns the deletion success message to the HLR;

in step 218, the HLR transmits a request for inserting user data to the MSC;

in step 219, the MSC returns the insertion success message to the HLR after inserting the user data successfully;

in step 220, the HLR returns the location update response message to the MSC;

in step 221, the MSC notifies the UTRAN to perform the encryption process;

in step 222, the MSC returns the location update response message to the UE;

The above steps 208-222 need to be performed only if the MSC to which the UE falls back and the MSC with which the UE jointly registers are not the same.

in step 223, the UE initiates a call establishment request to the MSC;

in step 224, the MSC notifies the UTRAN to establish ground circuits and radio resources;

in step 225, the MSC establishes interoffice bearers to the PSTN.

As described in step 203, the E-UTRAN decides the target cell to which the UE falls back according to the radio signal quality of the measurement report of the UE, which can not ensure the MSC which is served by the target cell to which the UE falls back and the MSC with which the UE jointly registers when accessing the EPS network are the same MSC. When the MSC to which the UE falls back and the MSC with which the UE jointly registers are not the same, the UE initiating a call needs to additionally add steps 208-222, which largely extends the access time of the service.

SUMMARY OF THE INVENTION

The technical problem to be solved by the present document is to provide a method and system for enabling a CSFB service in an EPS, which can reduce the service access time.

In order to overcome the above technical problem, the present document provides a method for enabling a CSFB service in an EPS, comprising:

after accessing an EPS network, a UE triggering the CSFB service when executing a CS network service, and the UE transmitting a CS network service request carrying a CSFB indication to an MME;

after receiving the CS network service request carrying the CSFB indication transmitted by the UE, the MME indicating an E-UTRAN to switch the UE to the CS network; and the E-UTRAN initiating the switching to switch the UE to the CS network through the MME and an MSC with which the UE jointly registers when accessing the EPS network.

Switching the UE to the CS network refers to switching the UE to a radio access network of the CS network, wherein, the radio access network of the CS network comprises a UTRAN or a GERAN.

The step of the E-UTRAN initiating the switching to switch the UE to the CS network through the MME and an MSC with which the UE jointly registers when accessing the EPS network comprises:

the E-UTRAN selecting a target cell of the switching, transmitting a switching request to the MSC with which the UE jointly registers when accessing the EPS network through the MME, and notifying the MSC with which the UE jointly registers when accessing the EPS network of the selected target cell of the switching;

the MSC with which the UE jointly registers when accessing the EPS network determining the radio access network of the CS network according to the target cell, transmitting a switching request to the radio access network of the CS network to indicate switching without bearers, after receiving the switching request, the radio access network of the CS network allocating radio signaling resources for the switching of the UE; and the radio access network of the CS network transmitting the access parameters of the radio signaling resources to the UE through the MSC, the MME and the E-UTRAN; and the UE being switched to the radio access network of the CS network according to the access parameters.

In the step of the E-UTRAN selecting a target cell of the switching, the E-UTRAN selects the target cell according to a measurement report of the UE.

After the step of the UE being switched to the radio access network of the CS network according to the access parameters of the radio signaling resources, the method further comprises: the MSC with which the UE jointly registers when accessing the EPS network triggering to indicate the radio access network of the CS network to allocate call bearers including ground bearer circuits and radio bearer resources to the UE.

The step of the E-UTRAN initiating the switching to switch the UE to the CS network through the MME and an MSC with which the UE jointly registers when accessing the EPS network comprises:

the E-UTRAN selecting a target cell of the switching, transmitting a switching request to the MSC with which the UE jointly registers when accessing the EPS network through the MME, and notifying the MSC with which the UE jointly registers when accessing the EPS network of the selected target cell of the switching;

the step of the MSC with which the UE jointly registers when accessing the EPS network determining the radio access network of the CS network according to the target cell, transmitting a switching request to the radio access network of the CS network to indicate switching without bearers, and after receiving the switching request, the radio access network of the CS network allocating radio signaling resources for the switching of the UE comprises:

if the MSC with which the UE jointly registers when accessing the EPS network determines that the target cell is not in the administration area of the MSC, using the MSC which administrates the target cell as the target MSC, the target MSC determining the radio access network of the CS network, the target MSC transmitting a switching request to the radio access network to indicate switching without bearers, after receiving the switching request, the radio access network of the CS network allocating radio signaling resources for the switching of the UE; and the radio access network of the CS network transmitting the access parameters of the radio signaling resources to the UE through the MSC, the MME and the E-UTRAN; and the UE being switched to the radio access network of the CS network according to the access parameters.

After the step of the UE being switched to the radio access network of the CS network according to the access parameters of the radio signaling resources, the method further comprises: the MSC with which the UE jointly registers when accessing the EPS network triggering to indicate the radio access network of the CS network to allocate call bearers including ground bearer circuits and radio bearer resources to the UE by the target MSC.

The CSFB service is triggered when the following CS network services are performed: a calling party calling service, a called party paging service, a fax service and a CS network video service.

In order to solve the above technical problem, the present document further discloses a system for enabling a CSFB service in an EPS, comprising: an MME, an E-UTRAN, and an MSC with which the UE jointly registers when accessing the EPS network, wherein, the MME is configured to, after receiving a service request carrying a CSFB indication transmitted by the UE, indicate the E-UTRAN to switch the UE to the CS network;

the E-UTRAN is configured to initiate the switching to switch the UE to the CS network through the MME and the MSC with which the UE jointly registers when accessing the EPS network; and the MSC with which the UE jointly registers when accessing the EPS network is configured to assist the E-UTRAN in switching the UE to the CS network.

The system further comprises a radio access network of the CS network, wherein, the E-UTRAN is further configured to select a target cell of the switching, transmit a switching request to the MSC with which the UE jointly registers when accessing the EPS network through the MME, and notify the MSC with which the UE jointly registers of the selected target cell of the switching;

the MSC with which the UE jointly registers when accessing the EPS network is further configured to determine the radio access network of the CS network according to the target cell notified by the E-UTRAN, and transmit a switching request to the radio access network to indicate switching without bearers;

the radio access network of the CS network is configured to, after receiving the switching request, allocate radio signaling resources for the switching of the UE, and transmit the access parameters of the radio signaling resources to the UE through the MSC, the MME and the E-UTRAN so that the UE is switched to the radio access network of the CS network according to the access parameters.

The MSC with which the UE jointly registers when accessing the EPS network is further configured to, after the UE is switched to the radio access network of the CS network according to the access parameters, indicate the radio access network of the CS network to allocate call bearers including ground bearer circuits and radio bearer resources to the UE.

The system further comprises a radio access network of the CS network and an MSC which administrates the target cell, wherein, the E-UTRAN is further configured to select a target cell of the switching, transmit a switching request to the MSC with which the UE jointly registers when accessing the EPS network through the MME, and notify the MSC with which the UE jointly registers of the selected target cell of the switching;

the MSC with which the UE jointly registers when accessing the EPS network is further configured to, if it is determined that the target cell is not in the administration area of the local MSC, use the MSC which administrates the target cell as the target MSC to indicate the target MSC;

the MSC which administrates the target cell is configured to determine the radio access network of the CS network, and transmit a switching request to the radio access network of the CS network to indicate switching without bearers; and the radio access network of the CS network is configured to, after receiving the switching request, allocate radio signaling resources for the switching of the UE, and transmit the access parameters of the radio signaling resources to the UE through the MSC, the MME and the E-UTRAN so that the UE is switched to the radio access network of the CS network according to the access parameters.

The MSC which administrates the target cell is further configured to be triggered by the MSC with which the UE jointly registers when accessing the EPS network to indicate the radio access network to allocate call bearers including ground bearer circuits and radio bearer resources to the UE by the MSC which administrates the target cell.

The radio access network of the CS network comprises a UTRAN or a GERAN.

The E-UTRAN is configured to select the target cell according to a measurement report of the UE.

Compared with the prior art, the present document provides a method for enabling a CSFB service, which avoids, by means of switching, the problem of extending service access time due to the need of location update as the MSC to which the UE falls back and the MSC with which the UE jointly registers are different when the UE performs the CSFB.

BRIEF DESCRIPTION OF DRAWINGS

The accompanying drawings illustrated here are used to provide further understanding of the present document and constitute a part of the present application, and the illustrative embodiments of the present document and the description thereof are used to explain the present document and do not constitute improper definition of the present document. In the accompanying drawings.

DESCRIPTION OF THE PREFERRED EMBODIMENTS

Figure 1:
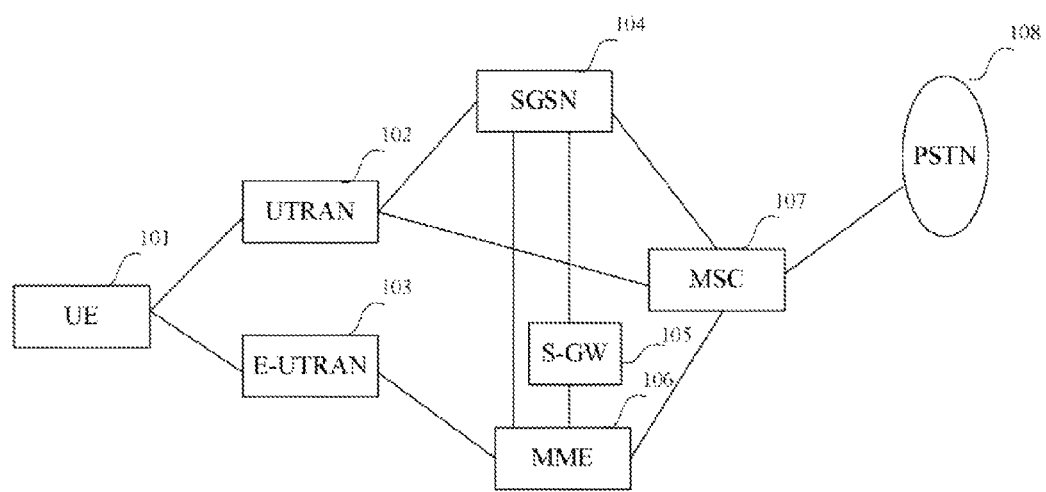
FIG. 1 is a diagram of network architecture of enabling a CS service when a terminal accesses an EPS network according to the prior art.
Figure 2:
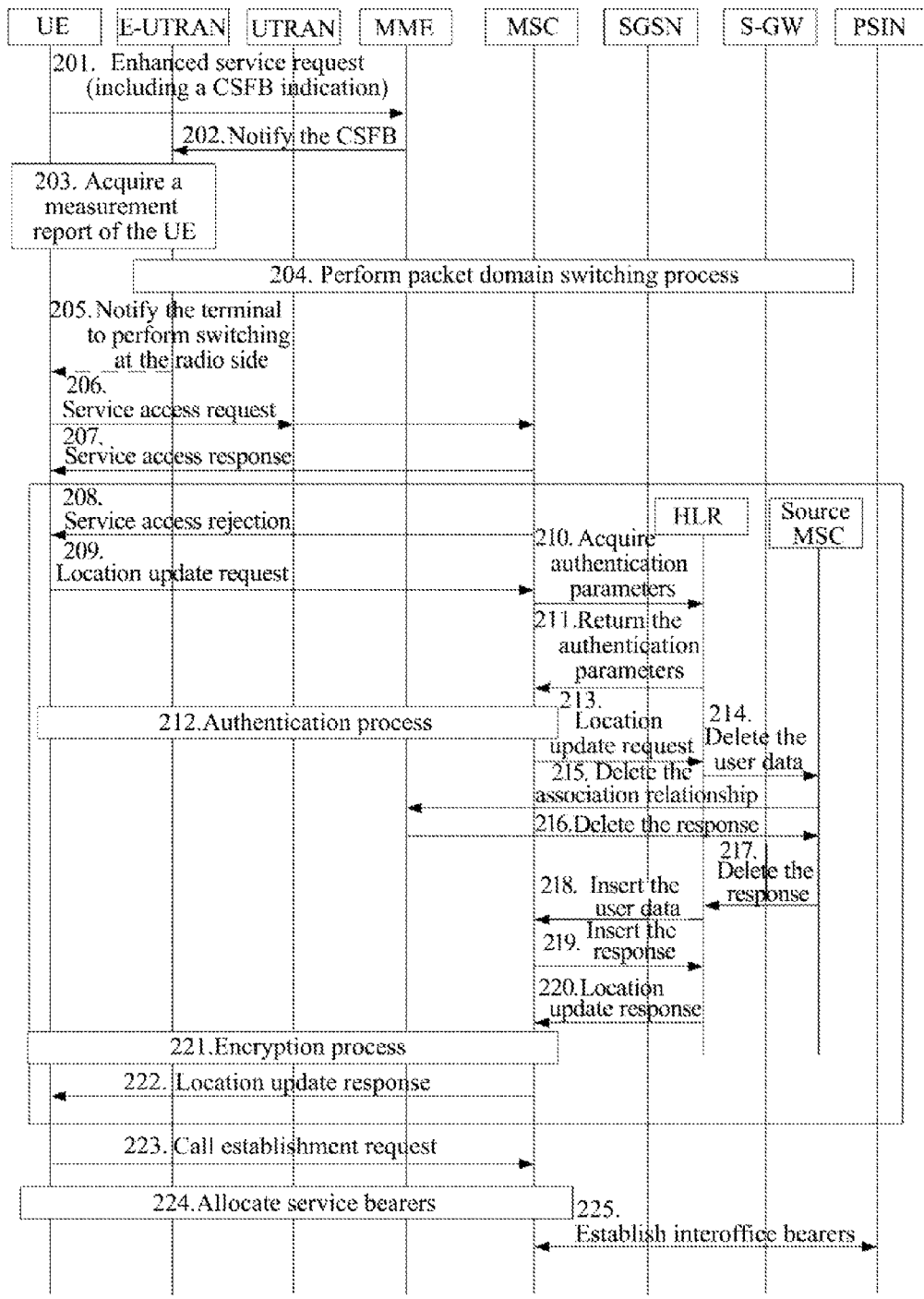
FIG. 2 is a calling flowchart of enabling a CS service to fall back to the CS network when a terminal accesses an EPS network according to the prior art.

The inventive concept of the embodiments is that the UE triggers the CSFB service when the UE performs a service of the CS network after accessing the EPS network, and the UE transmits a CS network service request to the MME while carrying a CSFB indication; after the MME receives the service request carrying the CSFB indication which is transmitted by the UE, the MME indicates the E-UTRAN to switch the UE to the CS network; the E-UTRAN initiates the switching to switch the UE to the CS network through the MME and the MSC with which the UE jointly registers when accessing the EPS network.

The CSFB service is triggered when the following CS network services are performed: a calling party calling service, a called party paging service, a fax service and a CS network video service.

Switching the UE to the CS network as described above refers to switching the UE to the radio access network of the CS network, including the UTRAN or the GERAN.

The above step of the E-UTRAN initiating the switching to switch the UE to the CS network through the MME and the MSC with which the UE jointly registers when accessing the EPS network comprises the following steps:

(a) the E-UTRAN selecting a target cell of the switching, transmitting a switching request to the MSC with which the UE jointly registers through the MME, and notifying the MSC with which the UE jointly registers of the selected target cell of the switching;

Preferably, the E-UTRAN can select a target cell according to a measurement report of the UE.

(b) the MSC with which the UE jointly registers determining the radio access network of the CS network according to the target cell, transmitting a switching request to the radio access network to indicate switching without bearers, after receiving the switching request, the radio access network allocating radio signaling resources for the switching of the UE; and the radio access network transmitting the access parameters of the radio signaling resources to the UE through the MSC, the MME and the E-UTRAN;

(c) the UE being switched to the radio access network of the CS network according to the access parameters.

After the UE is switched to the radio access network of the CS network according to the access parameters of the radio signaling resources, the MSC with which the UE jointly registers triggers to indicate the radio access network to allocate call bearers including ground bearer circuits and radio bearer resources to the UE.

When the MSC with which the UE jointly registers determines that the target cell is not in the administration area of the local MSC, the MSC which administrates the target cell is used as a target MSC, and the target MSC determines the radio access network of the CS network, the target MSC transmits a switching request to the radio access network to indicate switching without bearers, after receiving the switching request, the radio access network allocates radio signaling resources for the switching of the UE. When the call bearers are allocated, the MSC with which the UE jointly registers triggers to indicate the radio access network to allocate call bearers to the UE through the target MSC.

The present document will be further described in detail in conjunction with accompanying drawings and embodiments.

Embodiment One

Figure 3:
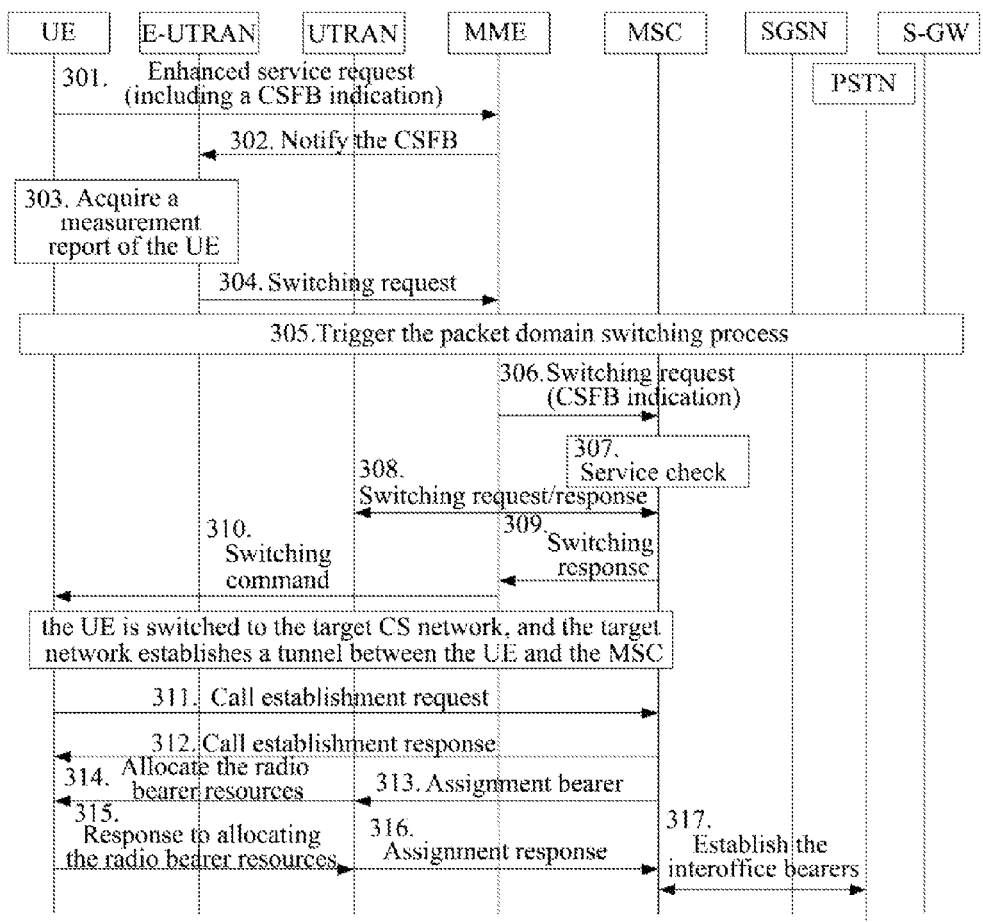
FIG. 3 is a flowchart of embodiment one of the present document.

FIG. 3 is an embodiment of a target UTRAN network being in the administration area of the MSC with which a user jointly registers. The user terminal initiates a call in the EPS network, the MME notifies the E-UTRAN to fall the user back to the UTRAN network, and the target UTRAN network is in the administration area of the MSC with which the user jointly registers, which comprises the following steps:

in step 301, the UE accesses the E-UTRAN network, and succeeds in jointly registering with the MSC, the user initiates a call, if the UE finds that the current network can not implement the call service of the CS network, the UE transmits enhanced service request message carrying a CSFB indication to the MME through the E-UTRAN network to notify the MME to switch the UE to the CS network;

in step 302, the MME transmits the CSFB notification message to the E-UTRAN according to the CSFB indication to indicate the E-UTRAN to switch the UE to the CS network;

in step 303, the E-UTRAN acquires a measurement report of the UE;

for example, the E-UTRAN can acquire a current radio measurement report from the UE or acquire the last measurement report which is stored by itself;

in step 304, the E-UTRAN selects a target cell according to the measurement report, transmits switching request message carrying parameters such as the CSFB indication, a source cell identity and a target cell identity to the MME, and if there is a connection of data service for the user currently, the switching request message further carries a bearer identity needed to be switched;

in the present step, no matter whether there is data service for the UE, the E-UTRAN will select one target cell according to the content of the measurement report.

The E-UTRAN at least transmits the CSFB indication and the related information of the target cell to the MME.

In step 305, the MME receives the switching request, determines whether there is data service for the user currently, and if so, triggers the packet domain switching process, which will not be described in detail by the present document here, and step 306 will be performed after the packet switching completes;

If there is not data service for the user currently, step 306 is performed directly.

In step 306, the MME determines whether the CSFB indication is carried in the switching request, and if it is carried, the MME transmits the switching request message carrying a user identity, target cell information and a CSFB indication to the MSC with which the UE jointly registers, As the user data is stored in the MME, the MME can acquire the MSC with which the UE jointly registers, the MME transmits the switching request to the MSC with which the UE jointly registers directly, and the MSC joins in the switching process, thus avoiding the problem of extending service access time as the MSC to which the UE falls back to and the MSC with which the UE jointly registers are different in the prior art.

If there is no CSFB indication in the switching request, it is to carry out according to the existing process.

in step 307, the MSC receives the switching request from the MME, when determining that the CSFB indication is carried in the switching request message, the MSC determines whether the SCFB service is allowed to be performed according to the service performed by the user, and if it is allowed, step 308 is performed; otherwise, the switching is rejected.

The scene of the present embodiment is that "the target UTRAN network is in the administration area of the MSC with which the user jointly registers", which is determined by the determination of the MSC in the present step. After the MSC determines that the CSFB service is allowed to be performed after receiving the switching request from the MME, whether the target cell indicated by the target cell identity carried in the switching request is in the administration area of the local MSC is further determined, and if so, step 308 is performed; and if not, it is to refer to the process of embodiment two.

In step 308, the MSC selects the target UTRAN according to the target cell in the switching request message, transmits the switching request message indicating switching without bearers, the UTRAN receives the switching request, allocates radio signaling resources, returns switching response message carrying access parameters of the radio signaling resources which have been allocated to the MSC.

In the present embodiment, there is no bearer for the UE in the CS network, and therefore, the MSC indicates switching without bearers to the target UTRAN, and the target UTRAN allocates radio signaling resources to the UE, i.e., control signaling resources dedicated to the switching signaling.

In step 309, the MSC receives the switching response message, and forwards the switching response message to the MME;

in step 310, the MME receives the switching response message, transmits a switching command to the UE through the E-UTRAN, and notifies the UE to be switched to the target UTRAN network, wherein, the switching command carries the access parameters of the radio signaling resources which have been allocated;

in step 311, the UE is switched to a radio channel reserved by the UTRAN according to the access parameters of the UTRAN radio signaling resources in the switching command to complete the switching operation, after the operation is completed, the UE encapsulates the call establishment message in apparatus message, and transmits the message to the MSC through the UTRAN network;

if it is another service, it can also be transmitted to the MSC through the call establishment message, with the difference that the types of the services are different.

in step 312, the MSC receives the apparatus message of the target UTRAN network, unpacks and acquires the call establishment message, determines the user call permission, and if the user call is allowed, the MSC encapsulates the call response message into the apparatus message and transmits the apparatus message to the UE;

in steps 313-316, the MSC transmits assignment bearer message to the UTRAN to notify the UTRAN to allocate call bearers including ground bearer circuits and radio bearer resources, i.e., wired bearers and wireless bearers to the UE, wherein the wireless bearers can be used to transfer voice media;

in step 317, the MSC establishes bearers with a remote PSTN according to a called number in the call establishment message in step 311.

Embodiment Two

Figure 4:
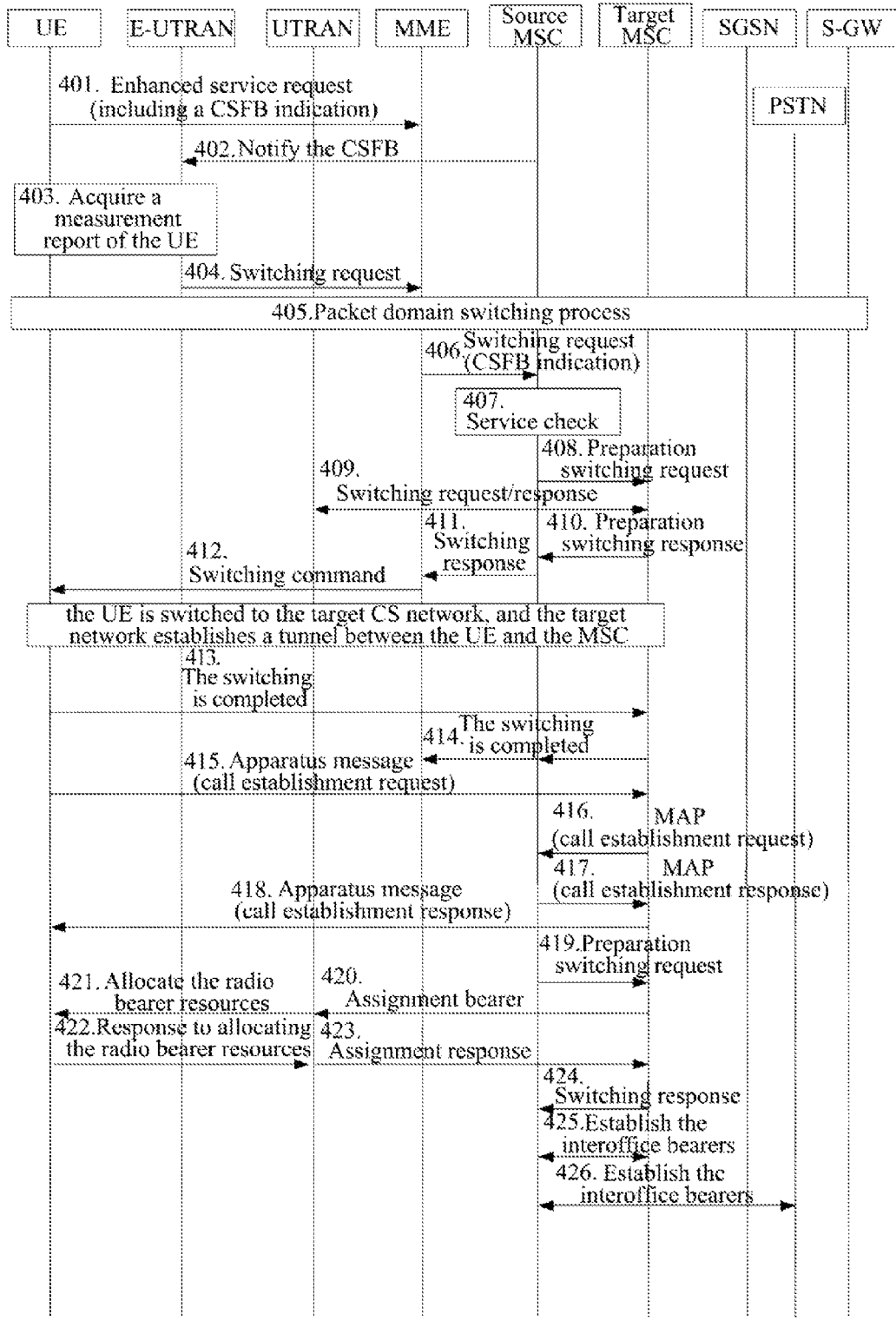
FIG. 4 is a flowchart of embodiment two of the present document.

FIG. 4 is for an embodiment where a target UTRAN network is not in the administration area of the MSC with which a user jointly registers. The user terminal initiates a call in the EPS network, the MME notifies the E-UTRAN to fall the user back to the UTRAN network, and the target UTRAN network is not in the administration area of the MSC with which the user jointly registers, which comprises the following steps:

steps 401-407 are the same as steps 301-307;

in the present embodiment, the MSC with which the UE jointly registers is referred to as a source MSC, and the MME transmits a switching request to the source MSC.

in step 408, the source MSC selects a target MSC according to the target cell in the received switching request message, transmits preparation switching request Mobile Application Part (MAP for short) message indicating switching without bearers to the target MSC;

the source MSC determines the target UTRAN to which the target cell belongs according to the target cell selected by the E-UTRAN, and determines the MSC which administrates the target UTRAN as a target MSC.

in step 409, the target MSC selects a target UTRAN according to the target cell in the switching request message, transmits the switching request message indicating switching without bearers, the UTRAN receives the switching request, allocates radio signaling resources, and returns switching response message carrying access parameters of the radio signaling resources which have been allocated to the MSC;

in step 410, the target MSC receives the switching response message, returns preparation switching response MAP message including content of the received switching response message to the source MSC;

in steps 411-412, the source MSC returns the switching response message to the MME, and the MME transmits a switching command carrying access parameters of the radio signaling resources to the UE through the E-UTRAN;

in step 413, the UE is switched to the radio channel reserved by the UTRAN according to the access parameters of the radio signaling resources in the switching command to complete the switching operation, and transmits switching completion message to the target MSC through the UTRAN;

in step 414, the target MSC notifies the MME of the switching completion message through the source MSC;

in step 415-416, the UE encapsulates the call establishment message in apparatus message, transmits the apparatus message to the target MSC through the UTRAN network, after the target MSC receives the apparatus message, the content of the apparatus message is encapsulated into MAP message to be transferred to the source MSC;

the called number is carried in the call establishment message.

in step 417, the source MSC receives the MAP message of the target MSC, unpacks and acquires the call establishment message, determines the user call permission, and if the user call is allowed, the MSC encapsulates the call response message into the MAP message and transmits the MAP message to the target MSC;

in step 418, the target MSC receives the MAP message, encapsulates the content of the message in apparatus message and transfers the apparatus message to the UE;

in step 419, the source MSC transmits preparation switching request MAP message carrying an allocation bearer indication to the target MSC;

in the present embodiment, the source MSC indicates the target UTRAN to allocate call bearers to the UE through the target MSC.

in steps 420-423, the target MSC transmits assignment bearer message to the UTRAN to notify the UTRAN to allocate ground bearer circuits and radio bearer resources to the UE;

in step 424, the target MSC allocates a switching number, and transmits switching response MAP message carrying the switching number to the source MSC;

the switching number is used to establish interoffice bearer between the source MSC and the target MSC.

In step 425, the source MSC establishes bearers with the target MSC according to the switching number;

in step 426, after completely establishing the bearer at the calling party, the source MSC establishes bearers with the remote PSTN according to the called number in the call establishment message in step 417.

Embodiment Three

Figure 5:
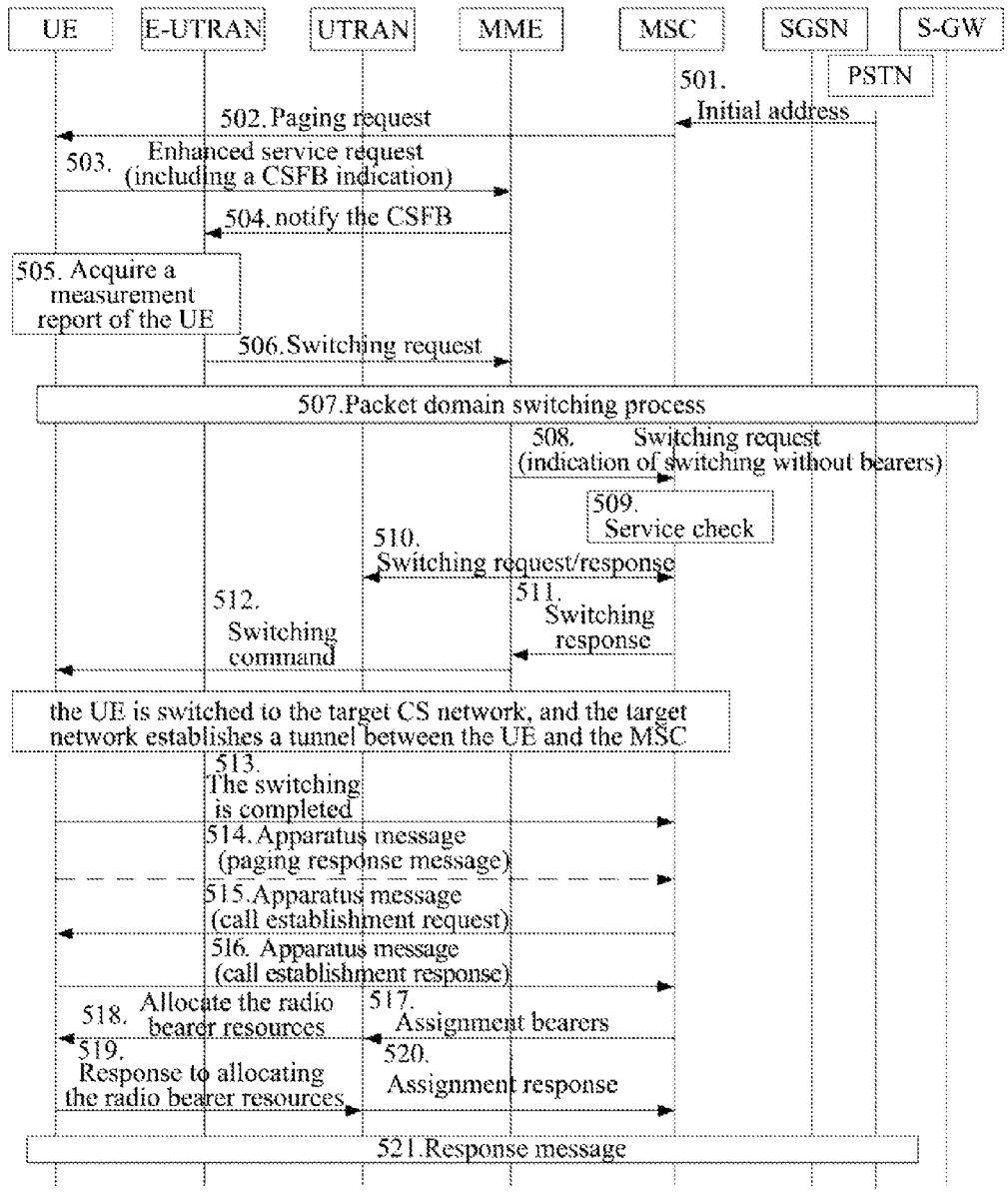
FIG. 5 is a flowchart of embodiment three of the present document.

FIG. 5 is for an embodiment for being called where a target UTRAN network is in the administration area of the MSC with which the user jointly registers. The user terminal receives the called paging (i.e., the user terminal which is regarded as a called party receives the paging) in the EPS network, the user terminal transmits an enhanced service request to the MME through the E-UTRAN to indicate the CSFB, the MME notifies the E-UTRAN to fall the user back to the UTRAN network, and the target UTRAN network is in the administration area of the MSC with which the user jointly registers, which comprises the following steps:

in step 501, the MSC receives an initial address request of a remote PSTN;

in step 502, the MSC transmits a paging request to the UE through the MME;

in step 503, after the UE receives the paging request, the UE transmits an enhanced service request message carrying a CSFB indication to the MME through the E-UTRAN network;

steps 504-512 are the same as steps 302-310;

in step 513, the UE is switched to the radio channel reserved by the UTRAN according to the access parameters of the UTRAN radio signaling resources in the switching command to complete the switching operation, and transmits switching completion message to the MSC through the UTRAN;

in step 514, the UE transmits paging response message to the MSC through the apparatus message in the UTRAN network;

the present step is an optional step, and the MSC can also use step 508 as the paging response message;

in step 515, the MSC encapsulates the call establishment message into the apparatus message, and transmits the apparatus message to the UE through the UTRAN network;

in step 516, the UE encapsulates the call response message into the apparatus message, and transfers the apparatus message to the MSC through the UTRAN network;

in steps 517-520, the MSC transmits assignment bearer message to the UTRAN to notify the UTRAN to allocate ground bearer circuits and radio bearer resources;

in step 521, the called party completely establishes the bearer, returns the response message to the remote PSTN to connect the call.

Embodiment Four

Figure 6:
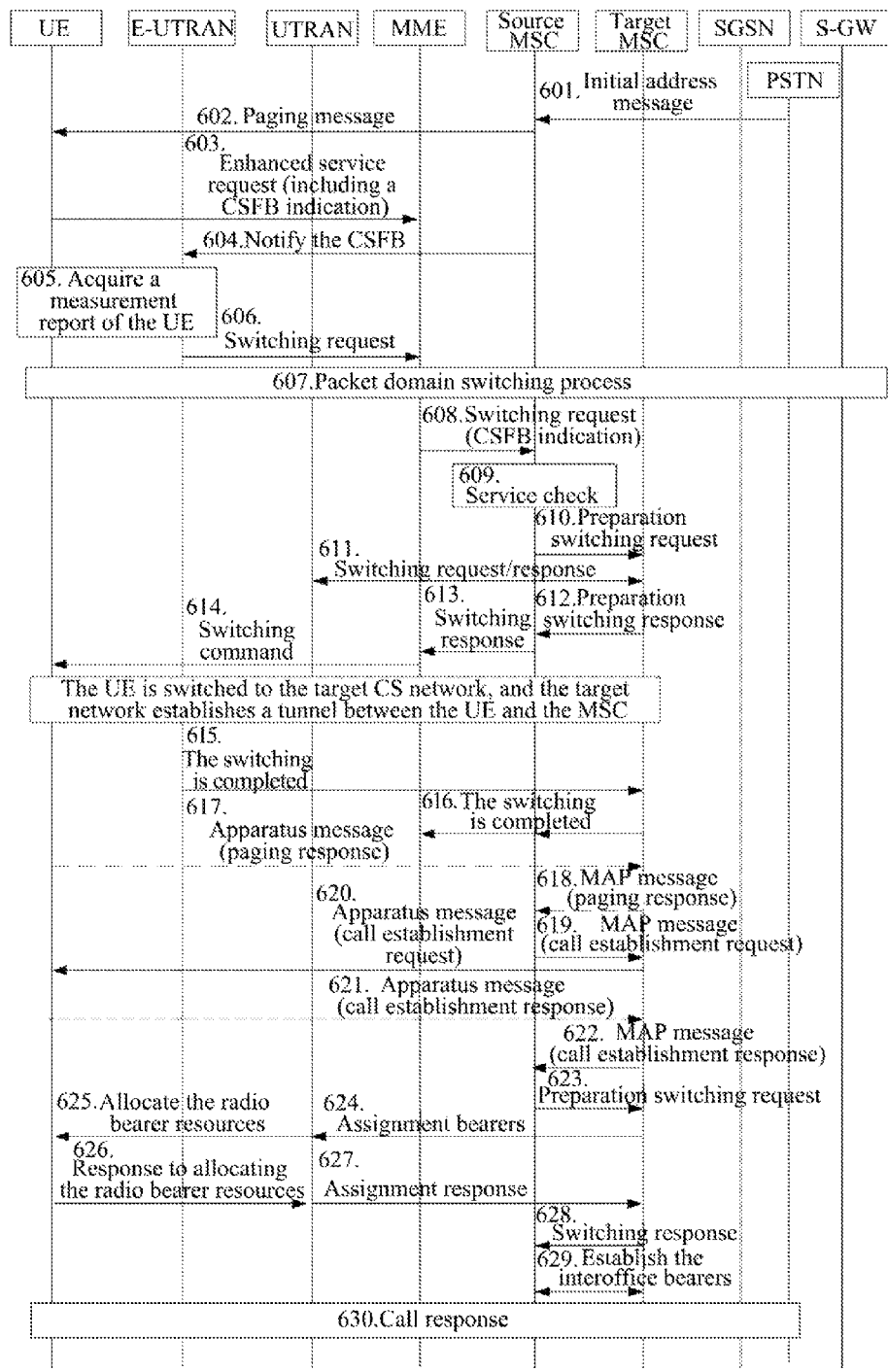
FIG. 6 is a flowchart of embodiment four of the present document.

FIG. 6 is for an embodiment for being called where a target UTRAN network is not in the administration area of the MSC with which the user jointly registers. The user terminal receives the called paging in the EPS network, the user terminal transmits an enhanced service request to the MME through the E-UTRAN to indicate the CSFB, the MME notifies the E-UTRAN to fall the user back to the UTRAN network, and the target UTRAN network is not in the administration area of the MSC with which the user jointly registers, which comprises the following steps:

steps 601-609 are the same as steps 501-509;

in step 610, the source MSC selects a target MSC according to the target cell in the received switching request message, and transmits preparation switching request MAP message indicating switching without bearers to the target MSC;

in step 611, the target MSC selects a target UTRAN according to the target cell in the switching request message, transmits the switching request indicating switching without bearers, the UTRAN receives the switching request, allocates radio signaling resources, and returns switching response message carrying access parameters of the radio signaling resources which have been allocated to the MSC;

in step 612, the target MSC receives the switching response message, returns preparation switching response MAP message including content of the received switching response message to the source MSC;

in steps 613-614, the source MSC returns the switching response message to the MME, and the MME transmits a switching command carrying access parameters of the radio signaling resources to the UE through the E-UTRAN;

in step 615, the UE is switched to the radio channel reserved by the UTRAN according to the UTRAN radio access parameters in the switching command to complete the switching operation, and transmits switching completion message to the MSC through the UTRAN;

in step 616, the target MSC notifies the MME of the switching completion message through the source MSC;

in steps 617-618, the UE transmits paging response message to the target MSC through the apparatus message in the UTRAN network, after the target MSC receives the paging response message, the content of the apparatus message is encapsulated into MAP message to be transmitted to the source MSC;

steps 617 and 618 are optional steps, and the MSC can use step 608 as the paging response message;

in step 619, the source MSC encapsulates the call establishment message into the MAP message, and transmits the MAP message to the target MSC;

in step 620, the target MSC receives the MAP message, encapsulates the content of the message in the apparatus message and transfers it to the UE;

in steps 621-622, the UE encapsulates the call response message into the apparatus message, transfers the apparatus message to the target MSC through the UTRAN network, the target MSC receives the apparatus message, encapsulates the content of the message in the MAP message and transfers it to the source MSC;

in step 623, the source MSC transmits preparation switching request MAP message carrying an allocation bearer indication to the target MSC;

in steps 624-627, the target MSC transmits assignment bearer message to the UTRAN to notify the UTRAN to allocate ground bearer circuits and radio bearer resources;

in step 628, the target MSC allocates a switching number, transmits switching response MAP message carrying the switching number to the source MSC;

in step 629, the source MSC establishes bearers with the target MSC according to the switching number;

in step 630, the called party completely establishes the bearer, returns the response message to the remote PSTN to connect the call.

The system for implementing the above method comprises: an MME, an E-UTRAN and an MSC with which the UE jointly registers when accessing the EPS network, wherein, the MME is configured to, after receiving a service request carrying a CSFB indication transmitted by the UE, indicate the E-UTRAN to switch the UE to the CS network;

the E-UTRAN is configured to initiate the switching to switch the UE to the CS network through the MME and the MSC with which the UE jointly registers when accessing the EPS network; and the MSC is configured to assist the E-UTRAN in switching the UE to the CS network.

the MSC with which the UE jointly registers is further configured to, after the UE is switched to the radio access network of the CS network according to the access parameters, indicate the radio access network to allocate call bearers including ground bearer circuits and radio bearer resources to the UE.

The above system further comprises a radio access network of the CS network, wherein, the E-UTRAN is further configured to select a target cell of the switching, transmit a switching request to the MSC with which the UE jointly registers when accessing the EPS network through the MME, and notify the MSC with which the UE jointly registers of the selected target cell of the switching;

the MSC with which the UE jointly registers is further configured to determine the radio access network of the CS network according to the target cell notified by the E-UTRAN, and transmit a switching request to the radio access network of the CS network to indicate switching without bearers; and the radio access network of the CS network is configured to, after receiving the switching request, allocate radio signaling resources for the switching of the UE, and transmit the access parameters of the radio signaling resources to the UE through the MSC, the MME and the E-UTRAN so that the UE is switched to the radio access network of the CS network according to the access parameters.

The above embodiments are only described by example of using the radio access network of the CS network as the UTRAN, and the radio access network of the CS network can also be the GERAN, of which the process is the same as that of the UTRAN.

The above description is only the preferred embodiments of the present document and is not intended to limit the present document. The invention can have a variety of changes and variations for those skilled in the art. Any modification, equivalent substitution, improvement etc. which are made within the spirit and principle of the present document should be included in the protection scope of the present document.

A person having ordinary skill in the art can understand that all or a part of steps in the above method can be implemented by programs instructing related hardware, and the programs can be stored in a computer readable storage medium, such as a read-only memory, disk or CD-ROM etc. Alternatively, all or a part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

INDUSTRIAL APPLICABILITY

The present document avoids, by means of switching, the problem of extending service access time due to the need of location update as the MSC to which the UE falls back and the MSC with which the UE jointly registers are different when the UE performs the CSFB.

What is claimed is:

1. A method for enabling a Circuit Switched Fallback (CSFB) service in an Evolved Packet System (EPS), comprising:

after accessing an EPS network, a User Equipment (UE) triggering a CSFB service when executing a Circuit Switching (CS) network service, and the UE transmitting a CS network service request carrying a CSFB indication to a Mobility Management Entity (MME);

after receiving the CS network service request carrying the CSFB indication transmitted by the UE, the MME indicating an Evolved Universal Mobile Telecommunication System Radio Access Network (E-UTRAN) to switch the UE to the CS network; and the E-UTRAN initiating the switching to switch the UE to the CS network through the MME and a Mobile Switching Center (MSC) with which the UE jointly registers when accessing the EPS network;

wherein the step of the E-UTRAN initiating the switching to switch the UE to the CS network through the MME and an MSC with which the UE jointly registers when accessing the EPS network comprises, the E-UTRAN selecting a target cell of the switching, transmitting a switching request to the MSC with which the UE jointly registers when accessing the EPS network through the MME, and notifying the MSC with which the UE jointly registers when accessing the EPS network of the selected target cell of the switching.

2. The method according to claim 1, wherein, switching the UE to the CS network refers to switching the UE to a radio access network of the CS network, wherein, the radio access network of the CS network comprises a Universal Mobile Telecommunication System Radio Access Network (UTRAN) or a Global System for Mobile communications (GSM) Enhanced Data Rate for GSM Evolution Radio Access Network (GERAN).

3. The method according to claim 1, wherein, the step of the E-UTRAN initiating the switching to switch the UE to the CS network through the MIME and an MSC with which the UE jointly registers when accessing the EPS network further comprises:

the MSC with which the UE jointly registers when accessing the EPS network determining the radio access network of the CS network according to the target cell, transmitting a switching request to the radio access network of the CS network to indicate switching without bearers, after receiving the switching request, the radio access network of the CS network allocating radio signaling resources for the switching of the UE; and the radio access network of the CS network transmitting the access parameters of the radio signaling resources to the UE through the MSC, the MIME and the E-UTRAN; and the UE being switched to the radio access network of the CS network according to the access parameters.

4. The method according to claim 3, wherein, in the step of the E-UTRAN selecting a target cell of the switching, the E-UTRAN selects the target cell according to a measurement report of the UE.

5. The method according to claim 3, wherein, after the step of the UE being switched to the radio access network of the CS network according to the access parameters of the radio signaling resources, the method further comprises: the MSC with which the UE jointly registers when accessing the EPS network triggering to indicate the radio access network of the CS network to allocate call bearers including ground bearer circuits and radio bearer resources to the UE.

6. The method according to claim 1, wherein, the step of the E-UTRAN initiating the switching to switch the UE to the CS network through the MIME and an MSC with which the UE jointly registers when accessing the EPS network further comprises:

if the MSC with which the UE jointly registers when accessing the EPS network determining that the target cell is not in an administration area of the MSC, using the MSC which administrates the target cell as the target MSC, the target MSC determining the radio access network of the CS network, the target MSC transmitting a switching request to the radio access network to indicate switching without bearers, after receiving the switching request, the radio access network of the CS network allocating radio signaling resources for the switching of the UE; and the radio access network of the CS network transmitting the access parameters of the radio signaling resources to the UE through the MSC, the MME and the E-UTRAN; and the UE being switched to the radio access network of the CS network according to the access parameters.

7. The method according to claim 6, wherein, after the step of the UE being switched to the radio access network of the CS network according to the access parameters of the radio signaling resources, the method further comprises: the MSC with which the UE jointly registers when accessing the EPS network triggering to indicate the radio access network of the CS network to allocate call bearers including ground bearer circuits and radio bearer resources to the UE by the target MSC.

8. The method according to claim 1, wherein, the CSFB service is triggered when the following CS network services are performed: a calling party calling service, a called party paging service, a fax service and a CS network video service.

9. A system for enabling a Circuit Switched Fallback (CSFB) service in an Evolved Packet System (EPS), comprising: a Mobility Management Entity (MME), an Evolved Universal Mobile Telecommunication System Radio Access Network (E-UTRAN), and a Mobile Switching Center (MSC) with which a User Equipment (UE) jointly registers when accessing the EPS network, wherein, the MME is configured to, after receiving a service request carrying a CSFB indication transmitted by the UE, indicate the E-UTRAN to switch the UE to the CS network;

the E-UTRAN is configured to initiate the switching to switch the UE to the CS network through the MME and the MSC with which the UE jointly registers when accessing the EPS network; and the MSC with which the UE jointly registers when accessing the EPS network is configured to assist the E-UTRAN in switching the UE to the CS network;

wherein the E-UTRAN is further configured to select a target cell of the switching, transmit a switching request to the MSC with which the UE jointly registers when accessing the EPS network through the MME, and notifying the MSC with which the UE jointly registers of the selected target cell of the switching.

10. The system according to claim 9, wherein, the system further comprises a radio access network of the CS network, wherein, the MSC with which the UE jointly registers when accessing the EPS network is further configured to determine the radio access network of the CS network according to the target cell notified by the E-UTRAN, and transmit a switching request to the radio access network to indicate switching without bearers;

the radio access network of the CS network is configured to after receiving the switching request, allocate radio signaling resources for the switching of the UE, and transmit the access parameters of the radio signaling resources to the UE through the MSC, the MME and the E-UTRAN so that the UE is switched to the radio access network of the CS network according to the access parameters.

11. The system according to claim 10, wherein, the MSC with which the UE jointly registers when accessing the EPS network is further configured to, after the UE is switched to the radio access network of the CS network according to the access parameters, indicate the radio access network of the CS network to allocate call bearers including ground bearer circuits and radio bearer resources to the UE.

12. The system according to claim 9, wherein, the system further comprises a radio access network of the CS network and an MSC which administrates the target cell, wherein, the MSC with which the UE jointly registers when accessing the EPS network is further configured to if it is determined that the target cell is not in an administration area of the local MSC, use the MSC which administrates the target cell as the target MSC to indicate the target MSC;

the MSC which administrates the target cell is configured to determine the radio access network of the CS network, and transmit a switching request to the radio access network of the CS network to indicate switching without bearers; and the radio access network of the CS network is configured to after receiving the switching request, allocate radio signaling resources for the switching of the UE, and transmit the access parameters of the radio signaling resources to the UE through the MSC, the MME and the E-UTRAN so that the UE is switched to the radio access network of the CS network according to the access parameters.

13. The system according to claim 12, wherein, the MSC which administrates the target cell is further configured to be triggered by the MSC with which the UE jointly registers when accessing the EPS network, to indicate the radio access network to allocate call bearers including ground bearer circuits and radio bearer resources to the UE by the MSC which administrates the target cell.

14. The system according to claim 10, wherein, the radio access network of the CS network comprises a Universal Mobile Telecommunication System Radio Access Network (UTRAN), or a Global System for Mobile communications (GSM) Enhanced Data Rate for GSM Evolution Radio Access Network (GERAN).

15. The system according to claim 10, wherein, the E-UTRAN is configured to select the target cell according to a measurement report of the UE.

16. The system according to claim 12, wherein, the radio access network of the CS network comprises a Universal Mobile Telecommunication System Radio Access Network (UTRAN), or a Global System for Mobile communications (GSM) Enhanced Data Rate for GSM Evolution Radio Access Network (GERAN).

* * * * *